TUNER

Filed Oct. 14, 1957

INVENTORS
SAMUEL J. HARRIS &
JOHN H. TEAF
BY
Busser, Smith & Harding
ATTORNEYS

INVENTORS
SAMUEL J. HARRIS &
JOHN H. TEAF
BY
Busser, Smith & Harding
ATTORNEYS

June 13, 1961 S. J. HARRIS ET AL 2,988,716

TUNER

Filed Oct. 14, 1957 4 Sheets-Sheet 3

INVENTORS
SAMUEL J. HARRIS &
JOHN H. TEAF
BY Busser, Smith & Harding
ATTORNEYS

INVENTORS
SAMUEL J. HARRIS &
JOHN H. TEAF
BY
Brewer, Smith & Harding
ATTORNEYS 2,988,716

TUNER

Samuel J. Harris, West Collingswood, and John H. Teaf, Merchantville, N.J., assignors to Radio Condenser Company, Camden, N.J., a corporation of New Jersey Filed Oct. 14, 1957, Ser. No. 690,013

12 Claims. (Cl. 336—131)

This invention relates to tuners and has particular reference to a tuner of the type in which a direct current is utilized to produce variable flux in the core of each of a group of associated inductances.

It has been recognized that tuning of the type just mentioned has various advantages of compactness and simplicity in view of the fact that the tuning is dependent solely on variation of a direct current which may be manually or automatically controlled, for example, in the latter case in a signal-seek type of receiver. In the case of super-heterodyne receivers, it is desirable that a single adjustment, of current in the instance under consideration, should vary the inductances of either two or three coils, there being usually three involved, one constituting the antenna reactance tuner, a second the tuning reactance in the radio frequency amplifier tuning circuit, and the third the tuning reactance in the oscillator tuning circuit. Tracking problems are thus involved and it is necessary to provide adjustments of the saturable reactor cores.

In accordance with the present invention, the necessary adjustability is provided in a fashion which maintains the high Q of each of the circuits involved. Additionally, in accordance with the invention there is a minimizing of pickup of noise from the direct current which is involved in control. In brief, the invention contemplates the provision of a magnetic core, of ferrite or similar magnetic material usable at high frequencies, which core comprises a pair of rods arranged in general parallelism with their ends bridged by members of similar magnetic material. Coils are wound on the rods in such fashion that they are effectively in series for flux which is confined to the magnetic circuit of the core structure. These same coils, however, are effectively in opposition from the standpoint of flux which extends in the same direction through the rods. The result of this is, when the coils are of the same inductances, a balancing out of noise which may appear in a direct flux threading both rods in the same direction. On the other hand, the coils are additive from the standpoint of building up inductance. In the operation of the device an adjustable direct flux extends in the same direction through the rods, and since the coils are effectively independent of each other from the standpoint of degree of saturation of the rods as it affects their inductance, the saturation provided by the direct flux changes their inductances simultaneously.

The arrangement, furthermore, lends itself to trimming adjustments by change of length of the magnetic core flux path merely by moving lengthwise of the rods one or both of the bridging core elements. This is accompanied without introduction of any air gap in the core and, in particular, by eliminating the involvement in such air gap of any portion of the iron which is involved in the core threaded by the flux due to the direct current. Any such involvement of iron represents a lowering of the Q of the circuit, and in accordance with the invention high Q is maintained during such adjustment. Furthermore, an independent adjustment which controls the direct flux for a given control current is afforded by changing a gap between the ferrite core assembly and the remaining portion of the direct flux core. Adjustment of this gap does not affect the high frequency characteristics since the gap is not traversed by any high frequency flux.

The foregoing indicates generally the objects of the invention and their attainment, and the attainment of other objects relating to details will become apparent from the following description, read in conjunction with the accompanying drawings, in which.

Figures 1, 2:
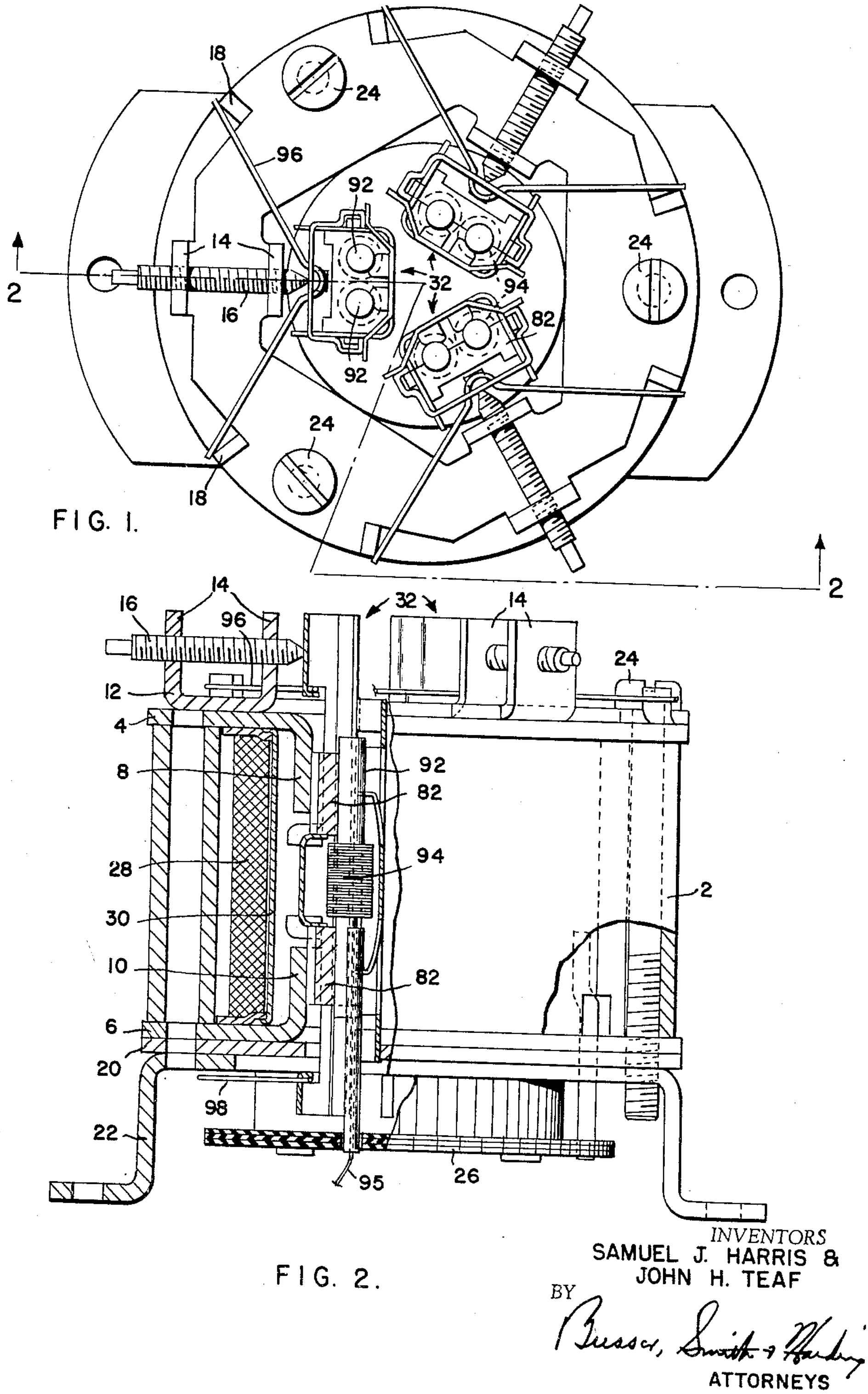
FIGURE 1 is a plan view, on a considerably enlarged scale, of a tuner provided in accordance with the present invention and suitable for use in a superheterodyne receiving circuit.
FIGURE 2 is a section and elevation taken on the broken surface indicated at 2—2 in FIGURE 1.

Referring first to the modification illustrated in FIGURES 1 to 10, inclusive, the tuner comprises a silicon steel or other magnetic iron core structure which provides the major part of the core for the direct flux and also provides various mounting means. As specifically illustrated, this may comprise a cylinder 2 of the magnetic core material at the ends of which there are located the plates 4 and 6 also of the magnetic core material. These are provided with central openings and furnish the respectively down-turned and up-turned ears 8 and 10, there being desirably three of each of these spaced 120° apart. Since the structure in this modification is symmetrical about the central axis and since the assemblies are duplicates of each other, only one need be described and shown in detail, that being the one to the left of FIGURE 1 and shown in section in FIGURE 2. A further plate 12 which may also be of the magnetic core material is located above the plate 4 and is provided with ears 14 for the reception of an adjusting screw 16 which will be hereafter referred to. The plate 12 also provides sets of lugs 18 which serve for the mounting of springs as hereafter described.

Below the plate 6 there is a plate 20 which may also be of the magnetic core material, which plate serves to provide certain supports and is associated with a bracket 22 for the mounting of the tuner in a receiver chassis. Bolts 24 are supplied to assemble the elements which have been described. While the core assembly may be formed of the various parts as described, it will be evident that it may take other structural forms consistent with its supplying the same essential magnetic structure and suitable mounting means for various elements and adjustment. There may, for example, be provided merely a two part casting or otherwise formed core structure consisting of a pot and a lid, suitably connected together. Sintered silicon steel may be used for such an arrangement. As will appear more fully hereafter, the arrangement which has been described provides a considerable degree of shielding of internal elements. Among other devices which may be assembled with the described core structure, there may be mounted thereon a terminal-supporting insulated disc such as indicated at 26.

Within the cylinder 2, and surrounding the ears 8 and 10 there is the direct current winding 28 which may be assembled on a spool 30. The current through this provides the control current for the inductances which will now be more fully described.

Three high frequency inductance assemblies are provided, each of these being indicated generally at 32. These assemblies are constituted of several parts, and reference may be first made to the individual structures of the parts.

Figure 3:
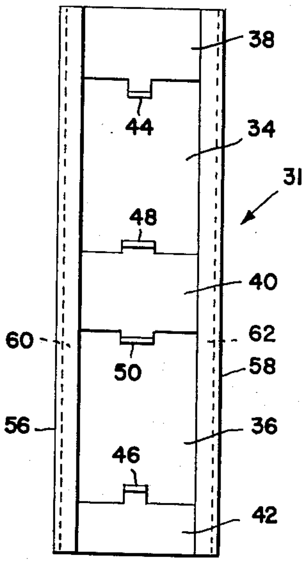
FIGURE 3 is a plan view of one of the assembled elements involved in providing a core assembly in accordance with the invention.
Figure 4:
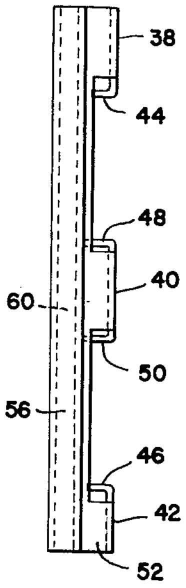
FIGURE 4 is a side elevation of the same.
Figure 5:
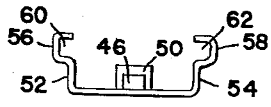
FIGURE 5 is an end elevation of the same.

FIGURES 3, 4 and 5 show one of these parts which constitutes the primary mounting means for the ferrite elements. This part, designated generally as 31, is desirably formed of brass or other non-magnetic material and comprises a sheet which is shaped as shown. The base portion is cut away at 34 and 36 to provide openings to receive the ears 8 and 10 previously described, there remaining bridging portions 38, 40 and 42. The upper bridging portion 38 is provided with an ear 44 for engagement by a mounting spring. In similar fashion, the lower bridge portion 42 is provided with an ear 46 for engagement by a lower spring. The central bridge portion 40 is provided with ears 48 and 50 which act merely as stops. The sides 52 and 54 of the element are formed at 56 and 58 to provide channels 60 and 62 for the reception of flange portions of the bridging ferrite elements.

Figure 6:
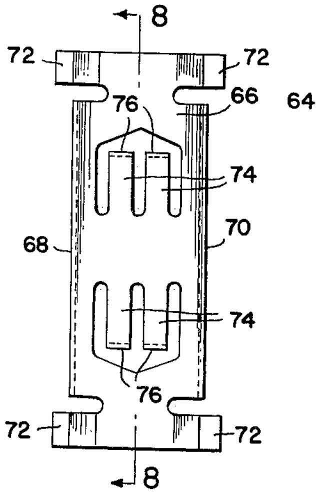
FIGURE 6 is a plan view showing an associated element of the core assembly.
Figure 8:
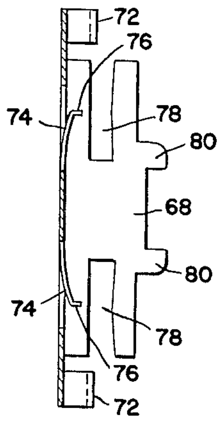
FIGURE 8 is a longitudinal section taken on the plane indicated at 8—8 in FIGURE 6.
Figure 7:
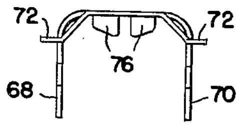
FIGURE 7 is an end elevation of the element shown in FIGURE 6.

Adapted to be assembled with each of the elements 31 is an element 64 which is shown particularly in FIGURES 6, 7 and 8. This element is desirably formed of spring material such as Phosphor bronze, and consists of a sheet thereof properly shaped. Its body portion 66 is provided with a pair of flanges 68 and 70 which are arranged to extend between the side portions 52 and 54 of the element 31. At the ends of the element 64 there are laterally extending feet 72 which are adapted to rest on the tops of the channels 60 and 62 as shown in FIGURE 1. Spring members 74 are diverted inwardly and terminate in projections 76 which are arranged to engage and retain seated ferrite rods. Slots 78 extend inwardly from the ends of the members 68 and 70, and these members are provided with ears 80 which are arranged to embrace the central ridge portion 40 of the element 31 and may be deflected to lock the assembly when completed.

Figure 9:
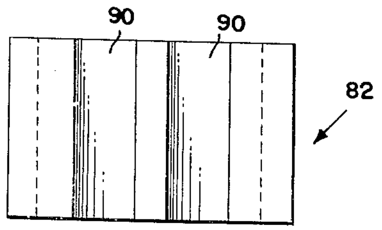
FIGURE 9 is a plan view of one of the ferrite elements of the high frequency magnetic core.
Figure 10:
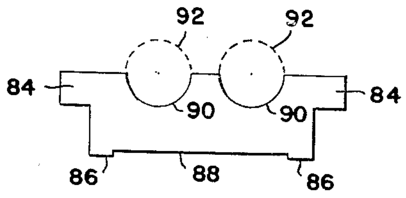
FIGURE 10 is an end elevation of the same, indicating additionally the location of ferrite rods in assembly therewith.

FIGURES 9 and 10 show one of the two core blocks which are duplicated in each assembly. These are formed of a ferrite or equivalent material suitable for use in a high frequency core. Each block, designated generally as 82 is provided with a pair of longitudinal flanges 84 which in assembly are arranged to be engaged in slots 78 of element 64 and in the channels 60 and 62. Pad surfaces 86 are arranged to engage or be closely adjacent to the ears 8 and 10 with which the assembly is associated. These pads 86 have desirably between them a slight cutaway portion 88 to afford a good flatwise contact or relationship between the pads 86 and the ears 8 and 10. Semicircular depressions indicated at 90 and which will be referred to as saddles are arranged to provide seating for the ferrite or equivalent rods 92. In each of the assemblies, each of the rods 92 carries a radio frequency winding 94. The windings which are thus associated in each assembly are so wound and connected in series, that, from the standpoint of flux which threads the closed high frequency magnetic circuit constituted by the rods 92 and the elements 82, they are in additive series so that the total inductance is constituted by their individual inductances and their mutual inductance. On the other hand, they are so arranged that direct flux passing through the ferrite assembly between the ears 8 and 10 will thread these in opposed relationship so that for variations in such flux their outputs cancel. The terminal leads of the series arrangement of the coils may be brought out at 95 through a suitable insulating tube.

In the assembly, the rods 92 are urged into seated relationship in their saddles by the spring fingers 74, the sloping contacting edges of the ends 76 of these fingers serving to retain them in definite positions. As will appear hereafter, it is desirable that when final adjustment is made the ferrite core elements be held in fixed position by cement, such as glyptal cement.

Diverging springs 96 and 98 which engage at their central portions the ears 44 and 46 react against and are held by ears 18 of the plate 12 and corresponding ears of the plate 20 or of the bracket 22. These springs tend to straighten out, and as a result of their action the lower member 82 is retained in engagement with the ear 10 while the upper member 82 is held in a position limited by engagement of portion 38 of element 31 with its associated adjusting screw 16, the arrangement being such that under normal adjusted conditions the upper element 82 is just slightly spaced from the ear 8, this spacing being adjustable to provide an adjustable air gap in the direct magnetic circuit in which the ferrite elements are located.

The three coil assemblies will ordinarily be used, as stated previously, for antenna tuning, for the tuning of the radio frequency amplifying stage, and for the oscillator tuning of a superheterodyne receiver. In the case of each of the assemblies there are two independent adjustments possible. The first is that involved in the ferrite core assembly itself. Generally, it is desirable to fix the rods 92 with respect to the lower saddle member 82, and this may be accomplished by one or more drops of a cement such as a glyptal resin cement. Then, either before or after the ferrite core assembly is placed in the tuner, the upper saddle member 82 may be adjusted longitudinally until the desired characteristic curve is obtained. When this is obtained, further drops of the cement may be used to fixedly hold the ferrite elements in proper relative positions. Finally, trimming is effected through adjustment of the screws 16, which adjust the gaps existing between the upper saddle member and the ear 8 of each of the elements of the tuner. This trimming adjustment will set the relationships of the characteristic curves and may be carried out in essentially conventional fashion. It may be particularly noted that the last adjustment has no effect on the Q of any of the high frequency circuits, since the high frequency flux is confined entirely to the ferrite magnetic circuit. The foregoing is in contrast with what has heretofore been proposed, involving the adjustment of a gap in a ferrite circuit which involves inclusion in the high frequency magnetic circuit of some part of the iron of the direct flux circuit.

The mechanical arrangement is also highly stable. It will be noted that there is symmetry involved in the relationships of the ears 8 and 10 to the saddle members 82, so that even slight displacement which may result from shocks will have negligible effects on the characteristics of the tuner.

It will, of course, be obvious that various mechanical details may be changed, particularly in the way of arrangement of adjusting screws, springs, or the like. It has been found advantageous, for example, in some arrangements to provide simple loop springs embracing the upper bridge portion 38 of an assembly and the adjacent ear 14 through which the corresponding adjusting screw 16 is threaded. Such a spring may be made much stronger than the type spring shown in FIGURES 1 and 2.

The assembly of the non-magnetic elements 31 and 64 also provides substantial shielding of each of the coil units. This local shielding in addition to that provided by the main iron core assembly insures quite effective shielding of the high frequency coils.

Figure 13:
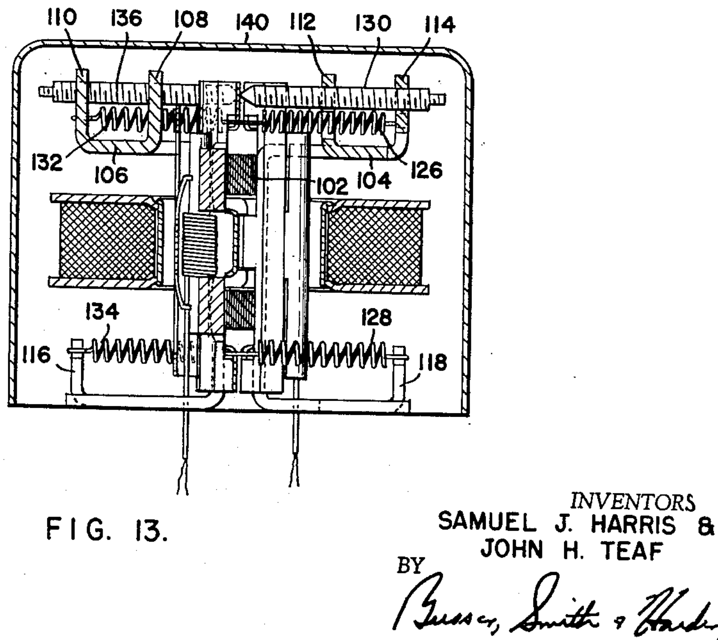
FIGURE 13 is a vertical section taken on the plane indicated at 13—13 in FIGURE 11.
Figure 11:
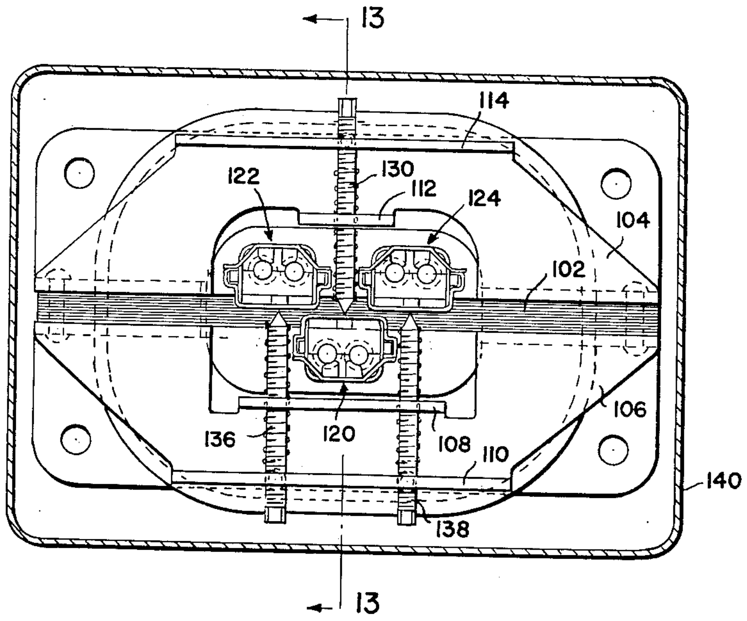
FIGURE 11 is a plan view, on an enlarged scale, of an alternative form of tuner provided in accordance with the invention.
Figure 12:
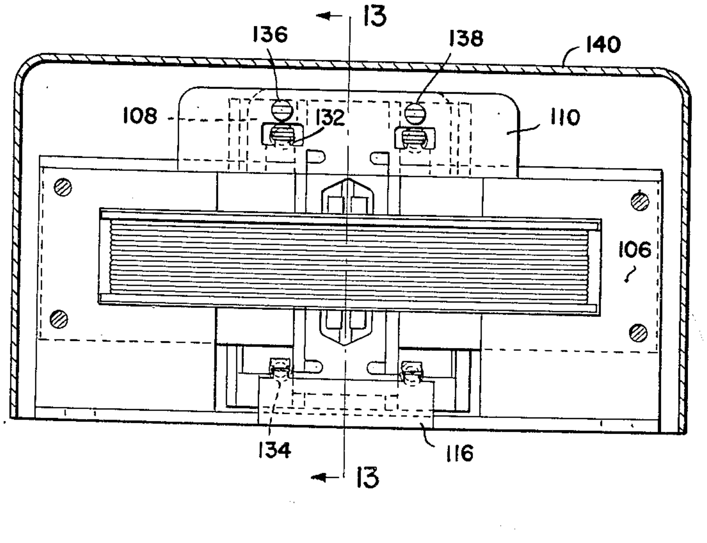
FIGURE 12 is a side elevation of the same.

The various aspects of the invention may also be embodied in rather radically different forms of which that illustrated in FIGURES 11, 12 and 13 is typical. The arrangement of these figures, in fact, provides a some-what less expensive structure utilizing for the direct magnetic core laminations of conventional type.

In this modification, a laminated core is provided at 102, and consists essentially of a rectangular frame associated with exterior members 104 and 106 which are provided for mechanical mountings, these being provided with upstanding flanges 108, 110, 112 and 114, and with lower flanges 116 and 118. Ferrite core and coil assemblies which may be identical with those previously described are provided at 120, 122 and 124 and are located so that their ferrite saddles contact or are held adjacent to the upper and lower horizontal extensions of the iron core. Springs 126 and 128 hold the ferrite core assembly in position for adjustment by screws 130 in the case of the central assembly 120. Similarly springs 132 and 134 and adjusting screw 136 serve for control and adjustment of the assembly 122. The adjusting screw for assembly 124 is illustrated at 138, and there are used springs in conjunction with this assembly similar to those described.

In this modification, shielding is provided by an external can 140.

It will be obvious that the characteristics of the last described modification are identical with those of the modification first described and adjustments may be made in similar fashion. It will be understood that numerous variations may be made in the specific embodiment of the invention without departing from the scope thereof, as defined in the following claims.

What is claimed is:

1. Tuning means comprising a magnetic core having a gap, means for varying the magnetic flux through said core, a plurality of coil and core assemblies bridging said gap and each comprising a substantially closed magnetic core of high frequency type carrying at least one winding, means mounting said assemblies independently so that the flux in the first-mentioned core threads the second-mentioned core of each assembly, means providing independent adjustments of the gaps between the respective cores of said assemblies and said first-mentioned core, and each of said assemblies having relatively adjustable elements for adjustment of the length of the flux path therethrough, whereby provision is made for multiple trimming adjustments of the tuning means.

2. Tuning means comprising a magnetic core having a gap, means for varying the magnetic flux through said core, a plurality of coil and core assemblies bridging said gap and each comprising a pair of core elements bridged by a second pair of core elements, said pairs of core elements being of high frequency type and relatively adjustable to provide adjustment of the flux path therethrough, and one pair of core elements of each said assembly carrying at least one winding, means mounting said assemblies independently so that the flux in the first-mentioned core threads each of the pairs of core elements carrying said windings, and means providing independent adjustments of the gaps between the respective core elements of said assemblies and said first-mentioned core, whereby provision is made for multiple trimming adjustments of the tuning means.

3. Tuning means comprising a magnetic core of cylindrical form with a gap at its interior, means for varying the magnetic flux through said core, a plurality of coil and core assemblies mounted within the gap of the first-mentioned core and shielded thereby, each of said assemblies comprising a first pair of magnetic core elements bridged by a second pair of magnetic core elements, said first pair carrying a pair of windings and said second pair being adjustable relative to the first pair to provide adjustment of the length of the flux path therethrough, said assemblies being mounted within the first-mentioned core so that the flux therein threads the said first pair of core elements of each of said assemblies, and means providing independent adjustments of the gaps between the first-mentioned core and the respective coil and core assemblies, whereby provision is made for multiple trimming adjustments of the tuning means.

4. Tuning means comprising a magnetic core of cylindrical form, means for varying the magnetic flux through said core, a plurality of coil and core assemblies mounted in the gap at the interior of said first-mentioned core and shielded thereby, each of said assemblies comprising a substantially closed magnetic core of high frequency type having at least one winding and elements for adjustment of the length of the flux path therethrough, and means mounting said assemblies so that the flux from the first-mentioned core threads the second-mentioned core of each of said assemblies and providing for independent adjustments of the gaps between the first-mentioned core and the respective assemblies, the last-mentioned means comprising for each said assembly resilient means urging the same in a direction to close said gap and adjustable means resisting said resilient means and limiting movement of the assembly in said direction to adjust said gap, whereby provision is made for multiple trimming adjustments of the tuning means.

5. Tuning means comprising a magnetic core having a gap, means for varying the magnetic flux through said core, a plurality of coil and core assemblies each comprising a first pair of magnetic elements of the high frequency type carrying a pair of windings and a second pair of similar elements bridging the first said pair, said elements being relatively adjustable for adjustment of the length of the flux path therethrough, means mounting said assemblies across said gap so that the flux in said first-mentioned core threads the first pair of core elements of each said assembly, said windings being connected in a series aiding arrangement with respect to flux having its circuit confined to said core elements but in series opposition with respect to flux traversing both the first-mentioned core and said core elements, and means providing independent adjustments of the gaps between the respective coil and core assemblies and the first-mentioned core, whereby provision is made for multiple trimming adjustments of the tuning means.

6. Tuning means comprising a magnetic core having a gap, means for varying the magnetic flux through said core, a plurality of coil and core assemblies each comprising a substantially closed magnetic core of high frequency type and carrying at least one winding, and means mounting said assemblies so that the flux in said first-mentioned core threads said magnetic core of each assembly and providing independent adjustments of the gaps between the first-mentioned core and the respective assemblies, the last-mentioned means comprising for each assembly resilient means urging the same in a direction to close said gap and adjustable means resisting said resilient means and limiting movement of the assembly in said direction, whereby provision is made for individual trimming adjustments of the tuning means.

7. Tuning means comprising a magnetic core of cylindrical form, means for varying the flux through said core, a plurality of coil and core assemblies each comprising a substantially closed core of high frequency type and carrying at least one winding, and means mounting said assemblies within the gap at the interior of the first-mentioned coil so that the flux therein threads the said closed core of each assembly and providing independent adjustments of the gaps between the first-mentioned core and the respective assemblies, the last mentioned means comprising for each said assembly resilient means urging the same in a direction to close said gap and adjustable means resisting said resilient means and limiting movement of the assembly in said direction, whereby provision is made for independent trimming adjustments of the tuning means.

8. Tuning means comprising a magnetic core having a gap, means for varying the magnetic flux through said core, a plurality of coil and core assemblies each comprising a substantially closed magnetic core of high frequency type and carrying at least one winding, and means mounting said assemblies so that the flux in said first-mentioned core threads said magnetic core of each assembly and providing independent adjustments of the gaps between the first-mentioned core and the respective assemblies, the last-mentioned means comprising for each assembly first and second plates disposed on opposite sides of the assembly, a spring on one plate urging the assembly toward the other plate, and adjustable stop means engaging said other plate, whereby provision is made for individual trimming adjustments of the tuning means.

9. Tuning means comprising a magnetic core having a gap, means for varying the magnetic flux through said core, a plurality of coil and core assemblies bridging said gap, each of said assemblies comprising a substantially closed magnetic core of high frequency type carrying at least one winding, and means mounting said assemblies so that the flux in the first-mentioned core threads the second-mentioned core of each assembly, each of said second mentioned cores having relatively adjustable elements for adjustment of the length of the flux path therethrough, whereby provision is made for individual trimming adjustments of the tuning means.

10. Tuning means comprising a magnetic core having a gap, means for varying the magnetic flux through said core, a plurality of coil and core assemblies each comprising a pair of core elements bridged by a second pair of core elements, said elements being of high frequency type and carrying at least one winding, at least one of said pair of core elements of each said assembly being adjustable relative to the other pair of core elements to provide adjustment of the length of the flux path therethrough, and means mounting each of said assemblies within said gap so that the flux of the first-mentioned magnetic core threads one of the pair of elements of each said assembly, whereby provision is made for individual trimming adjustments of the tuning means.

11. Tuning means comprising a magnetic core having a gap, means for varying the magnetic flux through said core, and a plurality of coil and core assemblies each comprising a substantially closed core of high frequency type carrying a pair of similar windings, means for mounting said assemblies across said gap so that the flux in the first-mentioned core threads the second-mentioned core of each said assembly, said windings being connected in a series aiding arrangement with respect to flux having its circuit confined to said substantially closed core but in series opposition with respect to flux traversing the first-mentioned and the substantially closed cores, each of said substantially closed cores having relatively adjustable elements for adjustment of the length of the flux path therethrough, whereby provision is made for individual trimming adjustments of the tuning means.

12. Tuning means comprising a magnetic core having a gap, means for varying the magnetic flux through said core, and a plurality of coil and core assemblies each comprising a pair of core elements bridged by a second pair of core elements, said elements being of high frequency type, means mounting said assemblies across said gap so that the flux of the first-mentioned magnetic core threads the first-mentioned pair of core elements of each of said assemblies, each of the last-mentioned pairs of core elements carrying a pair of windings connected in a series arrangement with respect to flux having its circuit confined to said elements but in series opposition with respect to flux traversing both the first-mentioned core and said elements, and one said pair of core elements being adjustable relative to the other pair of core elements to provide adjustment of the length of the flux path therethrough, whereby provision is made for individual trimming adjustments of the tuning means.

References Cited in the file of this patent

UNITED STATES PATENTS

| | | |
|---|---|---|
| 2,581,202 | Post | Jan. 1, 1952 |
| 2,611,094 | Rex | Sept. 16, 1952 |
| 2,786,940 | Crofts | Mar. 26, 1957 |
| 2,799,822 | Dewitz | July 16, 1957 |
| 2,813,256 | Duinker | Nov. 12, 1957 |
| 2,860,313 | Israel | Nov. 11, 1958 |
| 2,869,087 | Sontheimer | Jan. 13, 1959 |

FOREIGN PATENTS

| | | |
|---|---|---|
| 741,115 | Germany | Nov. 4, 1943 |